US012698846B2

(12) United States Patent
    Pedrelli et al.

(10) Patent No.: US 12,698,846 B2
(45) Date of Patent: Aug. 4, 2026

(54) METHOD FOR DETERMINING A CORRECTION VALVE FOR A REGULATING DEVICE FOR A REGULATING VALVE

(71) Applicant: VAT Holding AG, Haag (CH)

(72) Inventors: Luca Pedrelli, Landquart (CH); Markus Dachs, Buchs SG (CH)

(73) Assignee: VAT Holding AG, Haag (CH)

( * ) Notice: Subject to any disclaimer, the term of this patent is extended or adjusted under 35 U.S.C. 154(b) by 81 days.

(21) Appl. No.: 18/813,259

(22) Filed: Aug. 23, 2024

(65) Prior Publication Data

US 2025/0067363 A1     Feb. 27, 2025

(30) Foreign Application Priority Data

Aug. 23, 2023    (DE) .......................... 102023122643.6

(51) Int. Cl.
    *F16K 37/00*     (2006.01)
    *F16K 1/22*      (2006.01)
    *F16K 31/04*     (2006.01)
    *F16K 31/12*     (2006.01)
    *F16K 51/02*     (2006.01)

(52) U.S. Cl.
    CPC ............ *F16K 37/0041* (2013.01); *F16K 1/22* (2013.01); *F16K 31/041* (2013.01); *F16K 31/12* (2013.01); *F16K 37/005* (2013.01); *F16K 37/0075* (2013.01); *F16K 51/02* (2013.01)

(58) Field of Classification Search
    CPC .............. F16K 37/0041; F16K 37/005; F16K 37/0075; F16K 31/041; F16K 1/22; F16K 51/02
    See application file for complete search history.

(56) References Cited

U.S. PATENT DOCUMENTS

| | | | |
|---|---|---|---|
| 6,237,592 B1 | 5/2001 | Surjadi et al. |
| 6,895,351 B2 | 5/2005 | Grumstrup et al. |
| 7,788,056 B2 | 8/2010 | Beekhuizen et al. |
| 8,421,643 B2 | 4/2013 | Grumstrup |
| 9,546,925 B2 | 1/2017 | Dawson et al. |
| 9,797,765 B2 | 10/2017 | Nagai |

(Continued)

FOREIGN PATENT DOCUMENTS

DE        102014117988 A1     6/2016

*Primary Examiner* — Atif H Chaudry
(74) *Attorney, Agent, or Firm* — Volpe Koenig

(57)             ABSTRACT

A method for determining a correction value for a regulating device for a regulating valve. The regulating valve regulates a fluid flow through a chamber, and a shut-off element of the regulating valve is placed by the regulating device by an actuator of the regulating valve in mutually different positions relative to a throughflow opening for the fluid flow. An encoder is provided and each position of the shut-off element corresponds to an encoder value. A pressure value, in particular which is representative of the fluid in the chamber, is measured with a pressure sensor in mutually different positions of the shut-off element. The position of the shut-off element at which a maximum of the pressure values is measured is identified by the regulating device as the minimum throughflow position of the shut-off element. The correction is determined from the encoder value at which the minimum throughflow position is identified.

18 Claims, 7 Drawing Sheets

(56)                    References Cited

U.S. PATENT DOCUMENTS

| 2003/0150455 | A1 | 8/2003 | Bliss et al. |
| 2007/0079758 | A1 | 4/2007 | Holland et al. |
| 2008/0308157 | A1* | 12/2008 | Zhuang .............. F16K 37/0066 137/553 |
| 2009/0301579 | A1 | 12/2009 | Wong et al. |
| 2011/0040206 | A1 | 2/2011 | Burger et al. |

* cited by examiner

Fig. 4
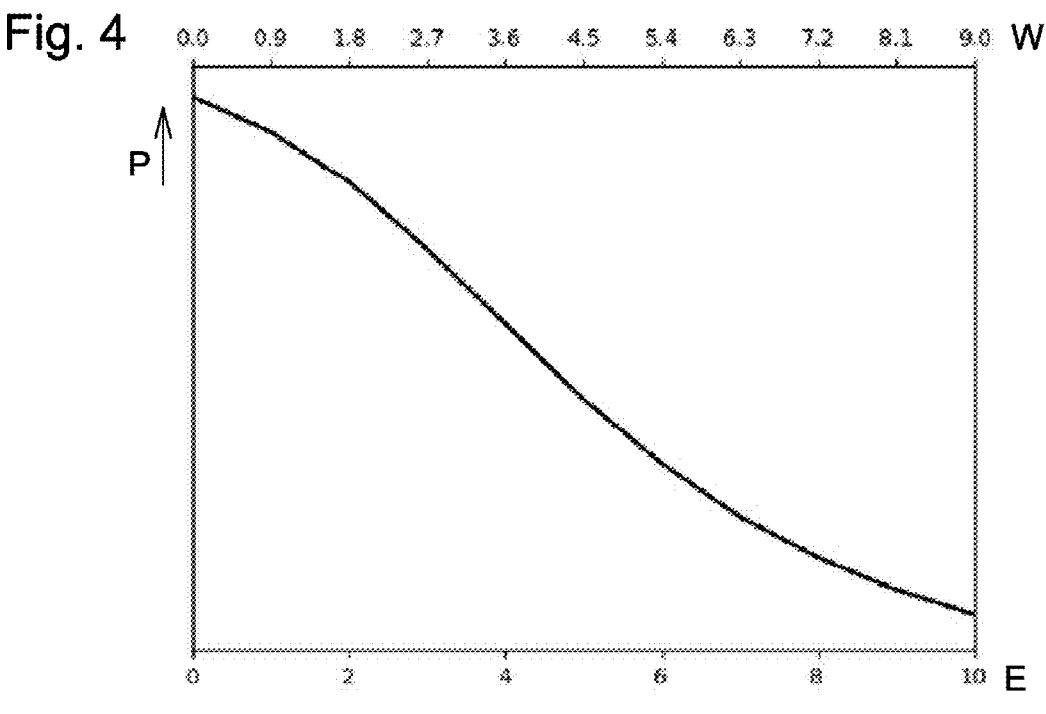
Fig. 5
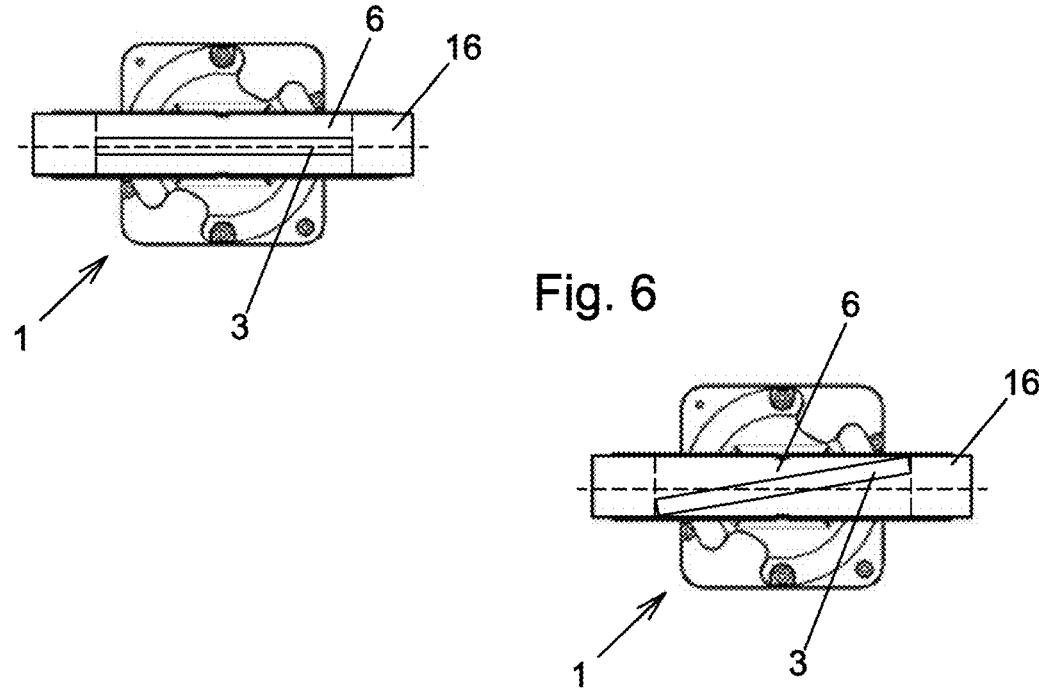
Fig. 6

Fig. 7
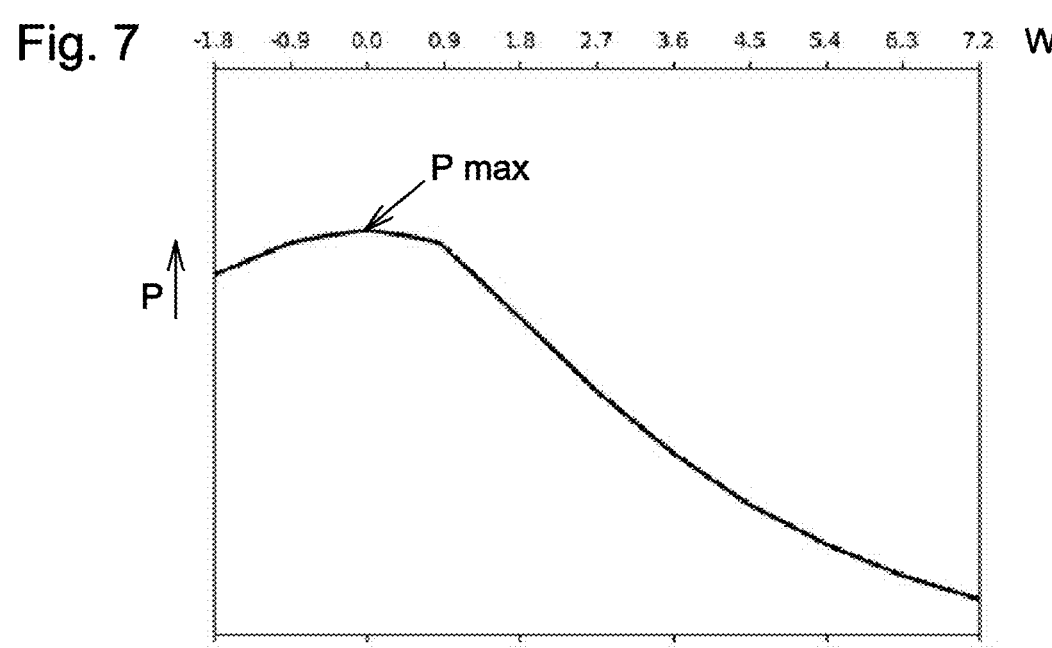
Fig. 8
Fig. 10
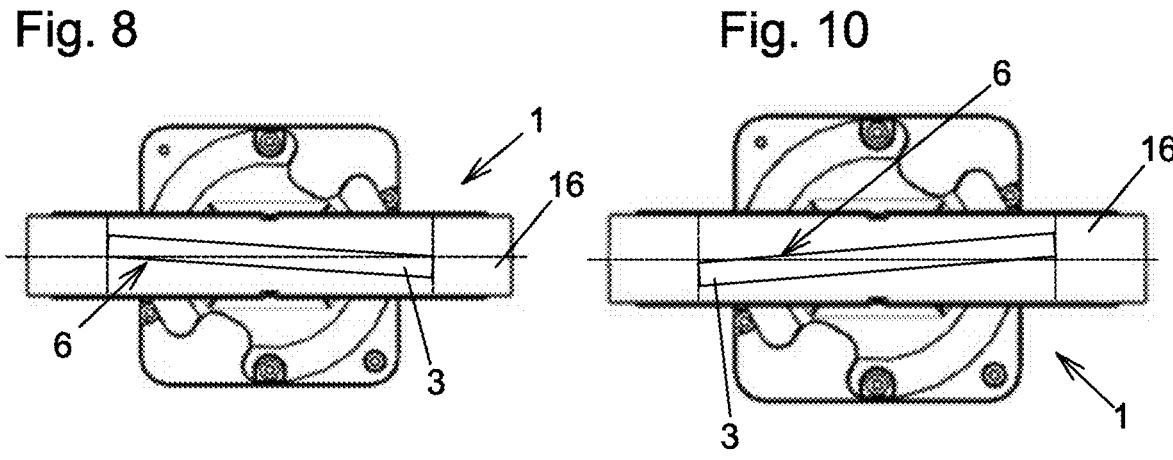
Fig. 9
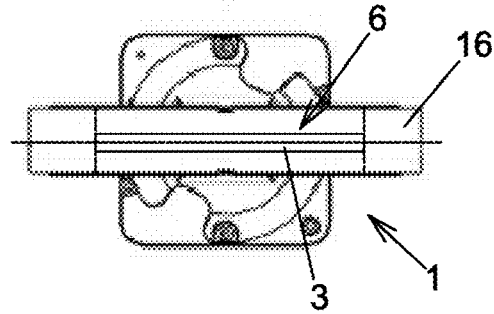

Fig. 11
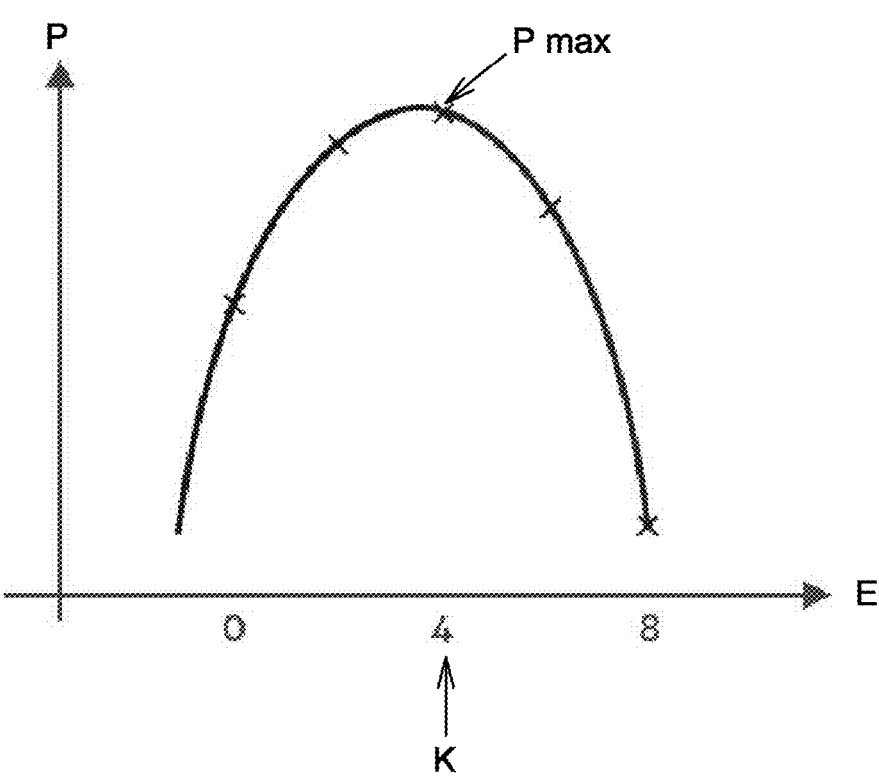
Fig. 12
Fig. 14
Fig. 13
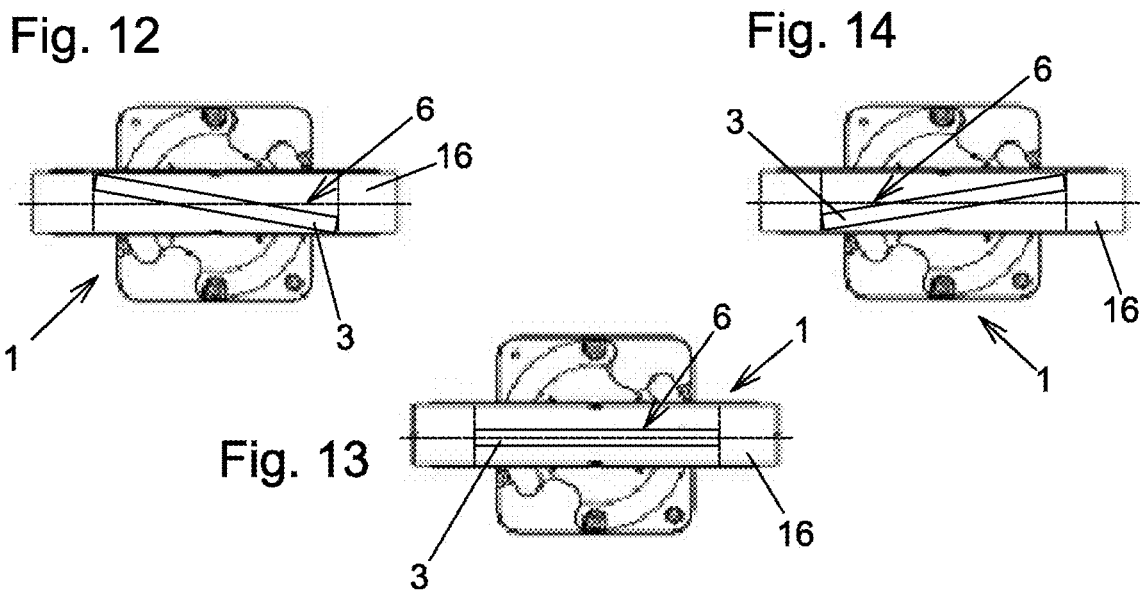

METHOD FOR DETERMINING A CORRECTION VALVE FOR A REGULATING DEVICE FOR A REGULATING VALVE

CROSS-REFERENCE TO RELATED APPLICATIONS

This application claims priority to German Patent Application No. 10 2023 122 643.6, filed Aug. 23, 2023, which is incorporated herein by reference as if fully set forth.

TECHNICAL FIELD

The present invention relates to a method for determining a correction value for a regulating device for a regulating valve. The invention furthermore also relates to a method for regulating the position of a shut-off element of a regulating valve using a correction value determined in this way.

BACKGROUND

Regulating valves are used in particular in so-called vacuum technology to regulate fluid flows through a chamber. It is thus possible to set by said regulating valves how much fluid per unit time flows through the chamber. Corresponding regulating valves are known in the prior art from prior public use. They have a shut-off element and an actuator for this shut-off element. The respective position of the shut-off element is determined by an encoder. The regulating device uses the encoder values output by the encoder as information about which position the shut-off element is currently assuming. If the shut-off element is situated in the minimum throughflow position, only the corresponding amount of fluid flows through the through-flow opening. In the minimum throughflow position, the shut-off element can completely shut off the throughflow opening such that the minimum throughflow then corresponds to no throughflow. In the minimum throughflow position, it can, however, also be possible that there is still a certain minimum throughflow. If more fluid needs to flow through the chamber, the shut-off element is moved by the actuator into a correspondingly more open position in which more fluid per unit time then correspondingly flows through the chamber.

The encoder value thus represents the respective position of the shut-off element. Ideally, the encoder value is equal to zero in the minimum throughflow position. However, in practice this is not the case when the regulating valve is put into service or if the regulating valve has to be serviced or the entire regulating valve has to be replaced. As a rule, the encoder thus does not necessarily output the value zero in the minimum throughflow position and instead outputs a different value.

SUMMARY

The object of the invention is therefore to make available a method for determining a correction value by which this problem can be solved.

To achieve this, the invention proposes a method having one or more of the features disclose herein.

The invention thus provides a method for determining a correction value for a regulating device for a regulating valve, wherein the regulating valve regulates a fluid flow through a chamber, and a shut-off element of the regulating valve is placed by the regulating device by an actuator of the regulating valve in mutually different positions relative to a throughflow opening for the fluid flow, wherein an encoder, in particular of the regulating valve, is provided and each position of the shut-off element corresponds to an encoder value of the encoder, wherein a pressure value, in particular which is representative of the fluid in the chamber, is measured with a pressure sensor in mutually different positions of the shut-off element, wherein the position of the shut-off element at which a maximum of the pressure values is measured is identified by the regulating device as the minimum throughflow position of the shut-off element and the correction value is determined from the encoder value at which the minimum throughflow position is identified.

The encoder value at which the minimum throughflow position is identified can be determined, for example, as the correction value. The correction value is then equal to the encoder value at which the minimum throughflow position is identified. The encoder value at which the minimum throughflow position is identified and the correction value can, however, also be in a different mathematical relationship to each other.

A fundamental concept of the invention is thus that the pressure is measured with the pressure sensor at different positions of the shut-off element, wherein the respective encoder value here represents the respective position of the shut-off element. The minimum throughflow position of the shut-off element, which could also be referred to as the maximum shut-off position of the shut-off element, is identified as the position at which the pressure value reaches its maximum. The correction value is then determined from the encoder value which the encoder outputs in the minimum throughflow position. The correction value could also be referred to as an offset.

The method according to the invention is thus a type of calibration procedure which is performed preferably once when the regulating valve is put into service, returned to service, or at least once after maintenance or replacement of parts of the regulating valve or parts of the whole assembly, in particular the actuator or the encoder. In the course of performing the method, it is then established which encoder value is output by the encoder in the minimum throughflow position of the shut-off element. Ideally, the encoder value is equal to zero in the minimum throughflow position. The correction value can then also be set to be equal to zero. As a rule, however, a different encoder value is output by the encoder in the minimum throughflow position of the shut-off element, from which encoder value the correction value can be determined in the subsequent operation of the regulating valve in a fashion which will be explained below.

The shut-off element is the part of the regulating valve which serves to completely or partially shut off or release the throughflow opening. In principle, the shut-off element can have a different form. In preferred embodiments, however, it is a disk-shaped shut-off element which can also be referred to as a shut-off disk or valve disk.

The throughflow opening, which is shut off or released to a corresponding extent depending on the position of the shut-off element, can be situated in a housing of the regulating valve. It is, however, for example, also possible that a throughflow opening is situated in a chamber wall of the chamber or in a fluid line which connects to the chamber. In the minimum throughflow position, the shut-off element can completely seal or shut off the throughflow opening but also still allow a certain or minimum throughflow. A person skilled in the art can design this as required for the respective use case. The minimum throughflow position can in every case also be referred to as the maximum shut-off position of the shut-off element.

3

The actuator of the regulating valve by which the shut-off element can be moved into its different positions relative to the throughflow opening can be designed, for example, as an electric servomotor. It can, however, also be a pneumatic, hydraulic, or a differently formed motor drive. Hybrid forms of these drives known per se are also possible.

The encoder can but does not have to be directly part of the regulating valve and in particular also of the actuator. It can, for example, be integrated into the actuator or be fitted onto it or can determine and represent the respective position of the shut-off element in a different fashion. It can, however, also be a digital encoder measuring analogously or in steps, i.e. in encoder steps. The encoder values can accordingly be a sequence of whole numbers in the case of a digital embodiment. In the case of encoders measuring analogously, the encoder values can, however, also represent the respective position of the shut-off element as rational numbers, i.e. with decimal places. It is preferably provided in every case that each position of the shut-off element corresponds to precisely one encoder value of the encoder. The encoder could also be referred to as a measuring transducer or in the case of a rotating encoder as a rotary encoder. The encoder values could correspondingly also be referred to as measuring transducer values or rotary encoder values.

The fluid flow through the chamber to be regulated by the regulating valve can be a pure gas flow but also a pure liquid flow or also mixtures thereof.

The pressure value measured by the pressure sensor is preferably a pressure value which is representative of the fluid in the chamber. It can be measured directly in the chamber but also in a line connected to the chamber or at a different suitable location. The pressure value is preferably in every case representative of the current pressure in the chamber.

When the method is performed, the position of the shut-off element should be at least the relevant variable which has the main influence on the respective pressure value. The pressure value should thus correlate clearly with the respective position of the shut-off element or be influenced by the latter. In other words, the position of the shut-off element should be the significant, clearly identifiable influencing variable for the pressure measured by the pressure sensor. Preferred embodiments of the method according to the invention provide that the position of the shut-off element during the performance of the method according to the invention for determining the correction value is the only influencing variable on the pressure measured by the pressure sensor. In this sense, it is thus preferably provided that fluid permanently flows through the chamber during the performance of the whole method and the change in the position of the shut-off element is the only variable which changes during the method and influences the fluid flow.

The regulating device receives the encoder values from the encoder and the pressure values from the pressure sensor. As a rule, the regulating device serves in the first instance to activate the actuator, depending on the requirements, i.e. the respective desired position of the shut-off element, taking into account the encoder values, in such a way that the shut-off element is moved into the respective desired position. In the method according to the invention, the regulating device serves, however, also to perform this method according to the invention and thus to determine the correction value. The regulating device can be directly part of the regulating valve. It can, however, also be an external regulating device which is correspondingly connected to the regulating valve and the pressure sensor.

It is preferably provided that the fluid is drawn by a pump through a rate-of-flow control valve and the chamber and the throughflow opening during the performance of the method according to the invention for determining the correction value. The regulating valve is preferably situated between the pump and the chamber. It can be arranged, for example, in a fluid line running between the pump and the chamber or also directly between the pump and the chamber.

In principle, the one-time performance of the method according to the invention for determining the correction value can be considered as sufficient. In particular, however, when the shut-off element has a certain amount of play, or it is a digital encoder which outputs only encoder values which are whole numbers, it can however also be appropriate to perform the method for determining the correction value once when the regulating valve is opened and once when it is closed. Preferred variants of the invention provide that the method is performed a first time and then a second time, wherein the fluid passes through the positions of the shut-off element in a first direction the first time and the fluid passes through the positions of the shut-off element in a second direction, opposite to the first direction, the second time and a first correction value is determined the first time and a second correction value is determined the second time, and the correction value is determined on the basis of the first correction value and the second correction value. In this case in which the correction value is thus determined on the basis of two correction values, namely the first correction value and the second correction value, it is also possible to refer to a final correction value which is then taken into account during the operation of the regulating valve, as further explained below. In order to calculate this final correction value, an average value can, for example, be calculated from the first correction value and the second correction value. It is, however, also conceivable to use just the smaller value or the larger value of the two said correction values as the final correction value. If the method according to the invention works with a digital encoder in which the encoder values are always whole numbers, the final correction value thus calculated can also correspondingly be rounded up or down to the next whole number.

It is in principle possible, in the method according to the invention for determining the correction value, to cover all the possible positions of the shut-off element in order thus to ensure that the minimum throughflow position and the corresponding encoder value is found. As a rule, however, enough advance information is present such that a person skilled in the art only has to cover a range of positions of the shut-off element which is to be established in advance in order thus to reliably also include the minimum throughflow position. Such advance information can, for example when replacing the regulating valve or parts of the regulating valve, be the encoder value in the minimum throughflow position of the previously used regulating valve. It is, however, also possible that the regulating valve has a starting position specified by a limit stop or in a different fashion and the shut-off element is placed, starting from the starting position of the shut-off element, in the mutually different positions relative to the throughflow opening for the fluid flow when the method is performed. Starting positions specified in a different fashion can, instead of the limit stop, be, for example, positions indicated on a housing of the regulating valve.

The method according to the invention for determining the correction value can be used for differently configured regulating valves. The regulating valve can thus be, for example, a so-called butterfly valve. It can also be provided that the shut-off element is a valve disk which can be pivoted by the actuator about a pivot axis running along the valve disk, wherein the valve disk projects beyond the pivot axis on sides of the pivot axis which are situated opposite each other. In the case of the so-called butterfly valves, it is also possible to say that the pivot axis runs within the plane of the valve disk, wherein the term the plane of the valve disk of course represents a certain simplification because of the spatial extent of the valve disk.

The regulating valve by which the method according to the invention for determining the correction value is implemented can, however, for example, also be a pendulum valve. It can thus be provided that the shut-off element is a valve disk which can be pivoted by the actuator about a pivot axis running parallel to a perpendicular to the valve disk. In the case of pendulum valves, the pivot axis generally runs at the edge next to the valve disk. The valve disk can be connected to the pivot axis via a pivot arm. The bearing of the pivot axis can, however, also be arranged directly at the edge of the valve disk.

In the case of the previously mentioned regulating valves in the form of butterfly valves and pendulum valves, the mutually different positions of the shut-off element are always mutually different angular positions. This also does not necessarily have to be the case. Methods according to the invention for determining the correction value can be used, for example, also with valves in which the shut-off element is mounted so that it can be displaced, in particular linearly. In the case of such regulating valves, the shut-off element is thus shifted back and forth between the different positions in which it closes the throughflow opening to a greater or lesser extent. The shut-off element can for this purpose be mounted, for example, on a guide, in particular a linear guide, or the like.

When the correction value is determined, it can then be used in the abovementioned operation of the regulating valve or in other words in the normal operation of the regulating valve in which the fluid flow through the through-flow opening is set correspondingly via a corresponding position of the shut-off element. This operation or in other words the normal operation of the regulating valve provides, in a method according to the invention for regulating the position of a shut-off element of a regulating valve by a regulating device, that the position of the shut-off element which is to be activated in each case is determined by the regulating device, taking into account a correction value determined with an abovementioned method according to the invention. Such a method could, in particular when no regulating variables other than just the specification of the desired position of the shut-off element are to be taken into account, also be referred to as a method for controlling the position of the regulating valve.

In this method, i.e. in the operation or the normal operation of the regulating valve, the minimum throughflow position is preferably an end position which, in contrast to the method according to the invention for determining a correction value, is not exceeded. In this operation or the normal operation of the regulating valve, it is preferably provided that the shut-off element is moved exclusively into such positions in which the respective encoder value is greater than or equal to the correction value or in which the respective encoder value is less than or equal to the correction value.

BRIEF DESCRIPTION OF THE DRAWINGS

Further features and details of preferred embodiments of the method according to the invention are explained by way of example below on the basis of exemplary embodiments, in which:

6

Figure 1:
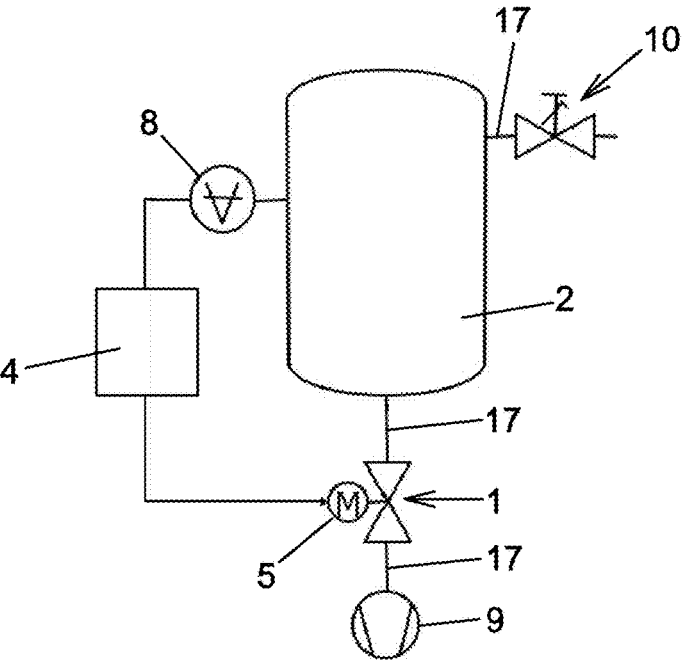
Figure 2:
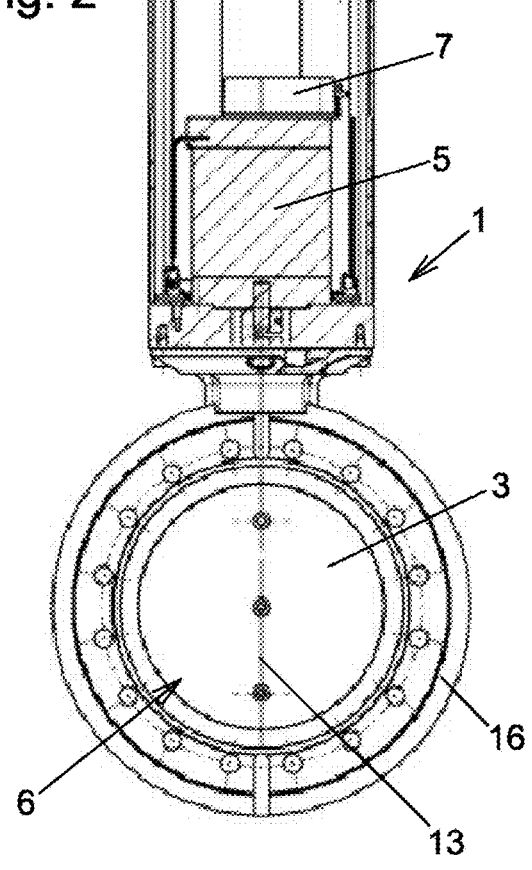
Figure 3:
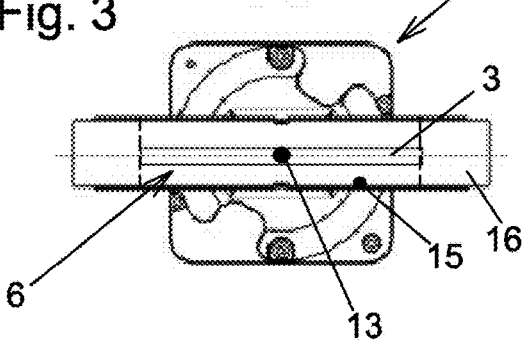
Figure 15:
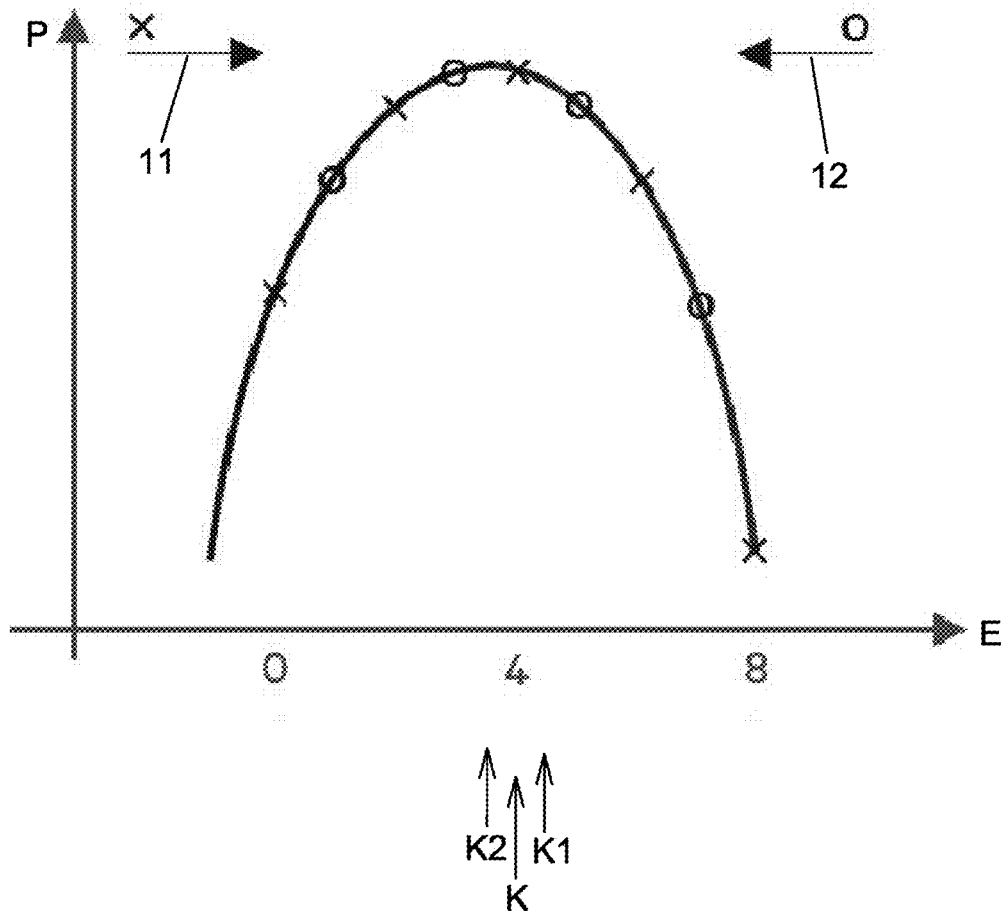
Figure 16:
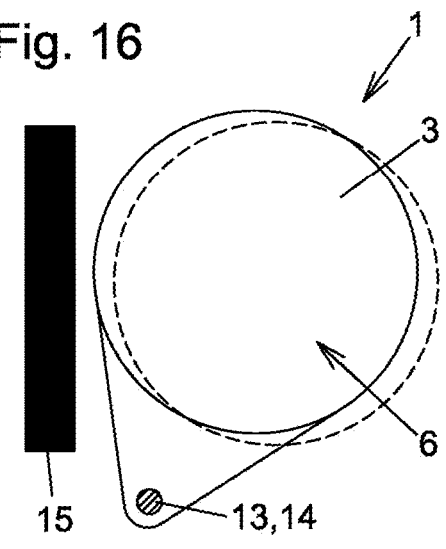
Figure 17:
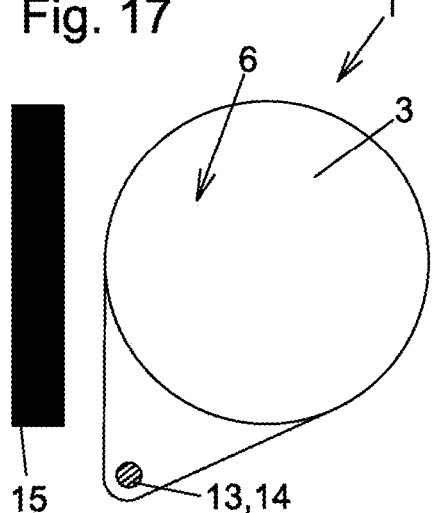
Figure 18:
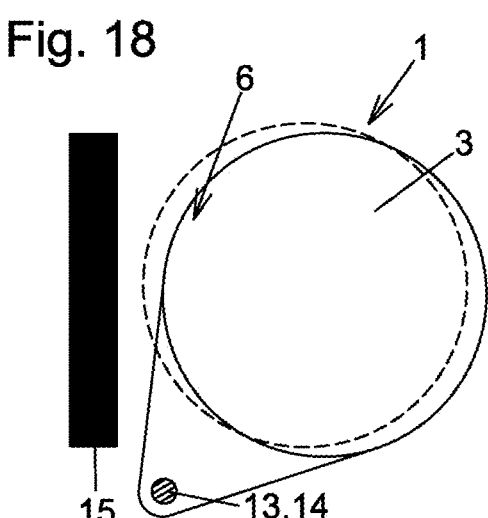
Figure 19:
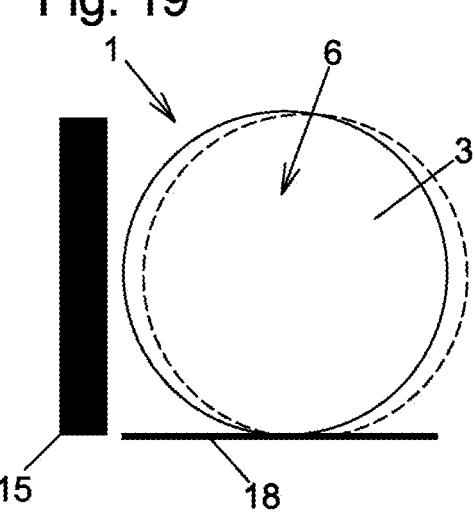
Figure 20:
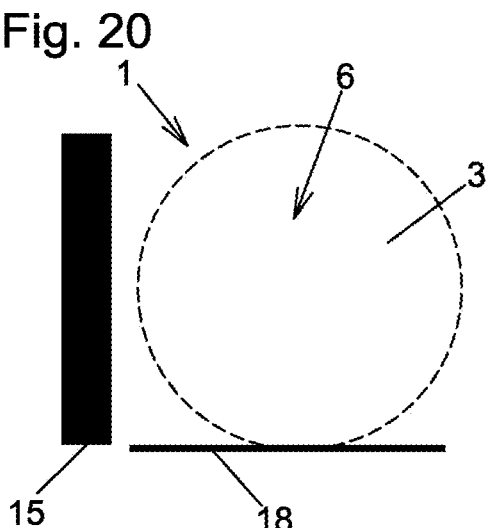
Figure 21:
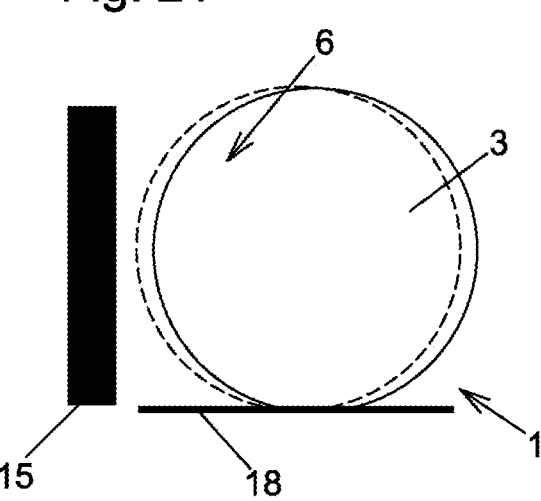
Figure 22:
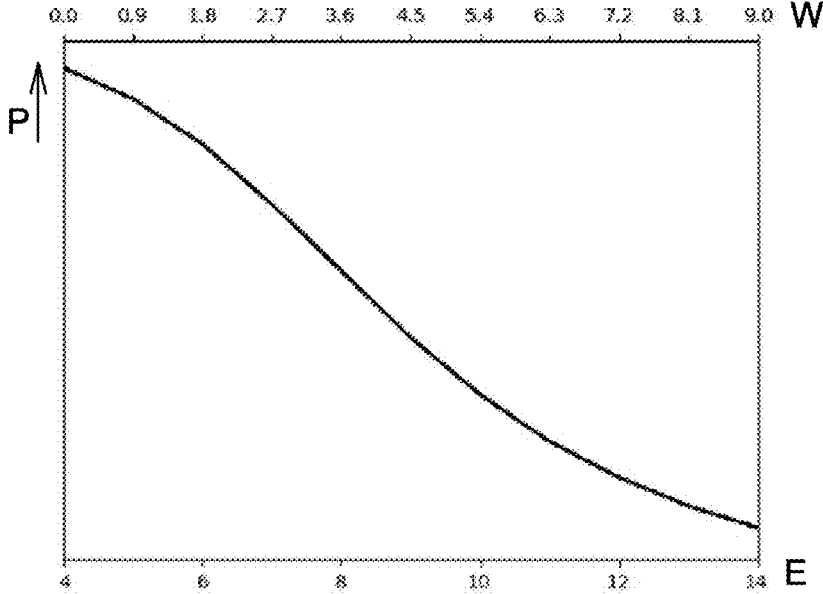
Figure 23:
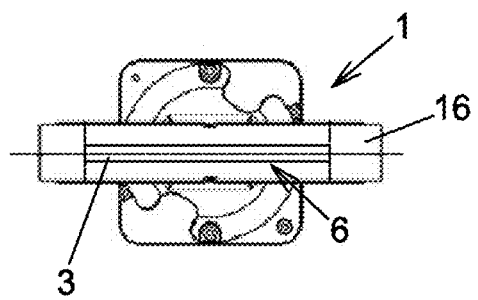
Figure 24:
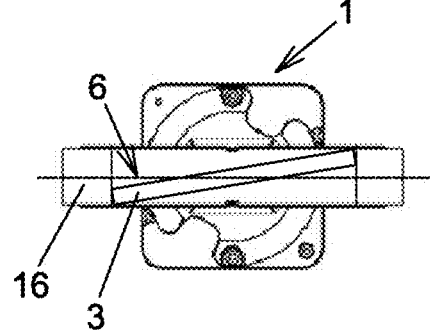

FIG. 1 shows an arrangement with a chamber and a regulating valve, by which the method according to the invention can be performed, in a schematic illustration;

FIG. 2 shows a schematic longitudinal section through a regulating valve in the form of a butterfly valve by which the method according to the invention can be performed;

FIG. 3 shows a schematic illustration in section of the regulating valve from FIG. 2 in the region of the shut-off element;

FIG. 4 shows an illustration of the pressure plotted against the encoder value for the situation where no correction value is necessary;

FIG. 5 shows the position of the shut-off element at the encoder value 0 from FIG. 4;

FIG. 6 shows the position of the shut-off element at the encoder value 10 from FIG. 4;

FIG. 7 shows an example, in an illustration similar to FIG. 4, in which a correction value is necessary;

FIG. 8 shows the position of the shut-off element at the encoder value 2 from FIG. 7;

FIG. 9 shows the position of the shut-off element at the encoder value 4 from FIG. 7 and FIG. 10 shows the position of the shut-off element at the encoder value 12 from FIG. 7;

FIG. 11 shows an illustration of the pressure plotted against the encoder value in order to exemplify a method according to the invention for determining a correction value;

FIG. 12 shows the position of the shut-off element of the regulating valve at the encoder value 0 from FIG. 11;

FIG. 13 shows the position of the shut-off element at the encoder value 4 from FIG. 11;

FIG. 14 shows the position of the shut-off element at the encoder value 8 from FIG. 11;

FIG. 15 shows an illustration of the pressure plotted against the encoder value for a second variant of a method according to the invention for determining a correction value;

FIGS. 16 to 18 show schematic illustrations of a regulating valve in the form of a pendulum valve;

FIGS. 19 to 21 show schematic illustrations of a regulating valve with a displaceably mounted shut-off element;

FIG. 22 shows an illustration of the pressure value plotted against the encoder value in order to exemplify a method for regulating the position of a shut-off element of the regulating valve using the correction value;

FIG. 23 illustrates the position of the shut-off element at the encoder value 4 from FIG. 22 and FIG. 24 illustrates the position of the shut-off element at the encoder value 14 from FIG. 22.

DETAILED DESCRIPTION

FIG. 1 shows a schematic illustration of an arrangement by which both the method according to the invention for determining the correction value and the method according to the invention for regulating the position of a shut-off element 3 of a regulating valve 1 can be performed. The arrangement comprises a chamber 2. It can here be, for example, a process chamber, a transfer chamber, or other chambers. Overall, the arrangement is preferably used in the field of vacuum technology but this does not necessarily have to be the case. This applies also to the methods according to the invention. It is possible to speak of vacuum technology in particular when working with pressure levels of less than or equal to 0.001 mbar (millibars) or 0.1 pascals.

It is, however, also possible to speak of vacuum technology when working with pressures below normal pressure, i.e. below 1 bar.

The regulating valve 1 is here arranged in this example in a fluid line 17 between the chamber 2 and the pump 9. The actuator 5 serves to adjust the shut-off element 3 of the regulating valve 1. The actuator 5 is activated by the regulating device 4. The regulating device 4 is for this purpose also connected to a pressure sensor 8 for determining a pressure value P, here a pressure value P which is representative of the pressure in the chamber 2. The fluid, in particular the gas, can flow into the chamber 2 via the rate-of-flow control valve 10 and a corresponding fluid line 17. The pump 9 builds up the reduced pressure required for this purpose. It is here thus a suction pump 9 which draws the fluid, in particular the gas, through the rate-of-flow control valve 10 and the chamber 2 and the throughflow opening 6 of the regulating valve 1. For the sake of completeness, it should be pointed out that the pressure sensor 8 could also be arranged in the fluid line 17 between the chamber 2 and the regulating valve 1 in order to measure a pressure value P which is representative of the pressure in the chamber 2. Other arrangements of the pressure sensor 8 would also be possible in principle.

FIG. 2 shows a schematic longitudinal section through a regulating valve 1 in the form of a so-called butterfly valve. The shut-off element 3 is here a valve disk which can be pivoted by the actuator 5 about the pivot axis 13 running along the valve disk. The valve disk here always projects beyond the pivot axis 13 on sides of the pivot axis 13 which are situated opposite each other. Such so-called butterfly valves are known per se and do not have to be explained further. In the minimum throughflow position illustrated in FIGS. 2 and 3, or in other words the maximum shut-off position, the shut-off element 3, i.e. here the valve disk, is arranged in the throughflow opening 6 such that it shuts off the throughflow opening 6 to a maximum extent, i.e. in other words only the minimum throughflow of fluid is possible. Depending on the exemplary embodiment of the regulating valve 1, the shut-off element 3 can completely shut off or seal the throughflow opening 6 in the minimum throughflow position such that the fluid flow is equal to zero. However, regulating valves 1 in which just a certain minimum value of the fluid flow through the throughflow opening 6 is still allowed in the minimum throughflow position are also possible.

In this exemplary embodiment of the regulating valve 1, the throughflow opening 6 is situated in a valve housing 16 of the regulating valve 1. However, as mentioned at the beginning, this does not necessarily have to be the case. It is also possible that the throughflow opening 6 is situated directly in a chamber wall of the chamber 2 or in another housing, for example, of the fluid line 17.

In order to pivot the valve disk or the shut-off element 3 about the pivot axis 13, the actuator 5 which is correspondingly activated by the regulating device 4 is provided in this regulating valve 1. As here in this exemplary embodiment, it can be an electric motor but also other suitable actuators 5 which are known per se in the prior art.

Also visible in the longitudinal section according to FIG. 2 is the encoder 7 which establishes the respective position of the shut-off element 3 and forwards it to the regulating device 4. The encoder 7 can, for example, directly access the pivot axis 13 rotated by the actuator 5 in order to determine its position. The encoder 7 is illustrated here in this exemplary embodiment as an additional part which is connected to the actuator 5. The encoder 7 could of course also be integrated into the actuator 5. It would, however, also be possible to use encoders 7 for establishing the position of the shut-off element 3 which are completely detached from the actuator 5 or even from the regulating valve 1.

A limit stop 15 which can optionally be present but does not have to be is also visible in FIG. 3, drawn schematically. If the shut-off element 3 is pivoted such that it comes to bear against the limit stop 15, it has reached a defined starting position.

FIGS. 4 to 10 now serve to explain the problem of the prior art which is to be solved with the invention.

In FIG. 4, pressure values P measured by the pressure sensor 8 for different positions of the regulating valve 1 are plotted against the encoder value E which is output in each case in the respective position of the encoder 7. In addition, the illustration also shows the actual angle W, i.e. the actual position of the shut-off element 3. The angle 0.0° here corresponds to the minimum throughflow position illustrated in FIG. 5. The angle W equal to 9.0° corresponds to the position, illustrated in FIG. 6, of the shut-off element 3 of the regulating valve 1. FIG. 4 shows the ideal state in which the encoder outputs the encoder value 0 when the shut-off element 3 is situated in the minimum throughflow position, i.e. in other words in the maximum closed position. In this position, the pressure value P is at its maximum.

As already mentioned at the beginning, this ideal state shown on the basis of FIGS. 4 to 6 often does not correspond to reality, however. Both when the arrangement is put into service and after the regulating valve 1 or the encoder 7 or the actuator 5 or components thereof has/have been replaced, it can occur that the encoder 7 no longer outputs the encoder value 0 and instead any other encoder value. An example of this is illustrated in FIG. 7. Here too, the pressure value P measured by the pressure sensor 8 is plotted against the encoder value E output by the encoder 7 in the respective position of the shut-off element 3. In addition, the angle W, i.e. the position, is also indicated here in which the shut-off element 3 is actually situated for the respective encoder value E. This angle W is, as in FIG. 4, always measured relative to the minimum throughflow position.

In the example illustrated in FIG. 7 and which is freely chosen here, the maximum Pmax of the pressure P measured by the pressure sensor 8 is not, as is in fact desirable, at the encoder value 0 and instead at the encoder value 4. The situation is here such that the minimum throughflow position at which the maximum Pmax of the pressure values P is measured corresponds to the encoder value 4 and not, as also implemented in the ideal situation according to FIG. 4, to the encoder value 0. FIG. 8 shows the position of the shut-off element 3 at the encoder value 2 from FIG. 7. FIG. 9 shows the minimum throughflow position of the shut-off element 3, as is reached at the encoder value 4 in the example according to FIG. 7. FIG. 10 shows the position of the shut-off element 3 at the encoder value 12 from FIG. 7.

If the fact illustrated on the basis of FIGS. 7 to 10 continues to not be taken into account, where the minimum throughflow position is reached not at the encoder value 0 and instead at a different encoder value, such as here at the encoder value 4 in this example, incorrect positions occur when regulating the position of the shut-off element 3 by the regulating device 4. In the case of these incorrect positions, the shut-off element 3 is set at angles W or positions other than those which are actually intended by the regulating device 4.

In order to be able to correct these possible errors, the method according to the invention for determining a correction value K for the regulating device 4 for the regulating valve 1 is provided, wherein the regulating valve 1 regulates a fluid flow through the chamber 2 and the shut-off element 3 of the regulating valve 1 is placed by the regulating device 4 by the actuator 5 of the regulating valve 1 in mutually different positions relative to a throughflow opening 6 for the fluid flow, and wherein an encoder 7, in particular of the regulating valve 1, is provided and each position of the shut-off element 3 corresponds to an encoder value E of the encoder 7, wherein a pressure value P, which is representative in particular of the fluid in the chamber 2, is measured in mutually different positions of the shut-off element 3 with the pressure sensor 8, wherein the position of the shut-off element 3 at which the maximum Pmax of the pressure values P is measured by the regulating device 4, is identified as the minimum throughflow position of the shut-off element 3, and the correction value K is determined from the encoder value E at which the minimum throughflow position is identified.

A first variant for performing this method is illustrated on the basis of FIGS. 11 to 14. The pressure value P measured by the pressure sensor 8 for different positions of the shut-off element 3 is again plotted in FIG. 11 against the encoder value E output in the respective position of the encoder 7. The solid line in FIG. 11 shows the continuous change in the pressure P with the modification of the position of the shut-off element 3 from smaller encoder values to the maximum Pmax of the pressure values P in the region of the encoder value 4 and the subsequent decrease of the pressure values P as the encoder values become higher. The crosses entered in FIG. 11 show the measured values for the situation where the pressure P is not measured continuously and instead only at certain encoder values, as is the case when only encoder values which are whole numbers are output, for example, by a digital encoder 7. FIG. 12 illustrates the position of the shut-off element at the encoder value 0 from FIG. 11. FIG. 13 shows the position of the shut-off element 3 in the minimum throughflow position at the encoder value 4 from FIG. 11 and FIG. 14 shows by way of example the position of the shut-off element 3 at the encoder value 8 from FIG. 11. It can be clearly seen that in FIG. 11 the maximum Pmax of the pressure values P is identified at the encoder value 4 when the method according to the invention for determining the correction value K is performed as illustrated here by way of example. In this example of the method according to the invention, this encoder value 4 is then determined as a correction value K.

If an encoder in which the encoder values E are output continuously, as illustrated by the solid curve in FIG. 11, were to be used instead of an encoder 7 which only outputs encoder values E which are whole numbers, it might be identified that the actual maximum Pmax is not exactly at the encoder value 4 and instead is slightly to one side of the latter, as is also the case in FIG. 11. In order to detect and if necessary take into account this or also any play in the shut-off element 3 which may be present, the method according to the invention for determining the correction value K can also be carried out twice, as was already explained at the beginning. It can thus be provided that the method is performed a first time and then a second time, wherein the fluid passes through the positions of the shut-off element 3 in a first direction 11 the first time and the fluid passes through the positions of the shut-off element 3 in a second direction 12, opposite to the first direction 11, the second time and a first correction value K1 is determined the first time and a second correction value K2 is determined the second time, and the correction value K is determined on the basis of the first correction value K1 and the second correction value K2.

An example of this is shown in FIG. 15. The method has here been performed a first time in the direction 11, i.e. from smaller encoder values to larger encoder values E, and a second time in the second direction 12 from larger encoder values E in the direction of smaller encoder values E. The pressure values P which have been determined when performing the method in the first direction 11 are illustrated in FIG. 15 with the symbol x. The pressure values P marked with the circle have been determined when performing the method in the second direction 12. When the method is performed for the first time, the correction value K1 is produced. When the method is performed for the second time, the correction value K2 is produced from the respective position of the maximum Pmax of the measured pressure values P. If this is compared with the solid curve, i.e. the one representing continuous pressure measurement, it can be seen that the encoder values E determined as correction values K1 and K2 both deviate somewhat from the actual maximum Pmax of the pressure values P. There are now various options for determining a common correction value K on the basis of the first correction value K1 and the second correction value K2. For example, averaging would also be possible. A decision could also be made to reuse the smaller or the larger of the two values as a correction value K. If the regulating device 4 and the encoder 7 work only with encoder values E which are whole numbers, it is also possible to provide that the correction value K is rounded up or down to a whole number. The residual error which may be produced is acceptable in every case. The ultimately determined correction value would also correspond to the encoder value 4 in the example illustrated in FIG. 15.

When the method according to the invention for determining the correction value K is performed, it is preferably provided in every case, as already explained at the beginning, that fluid permanently flows through the chamber 2 throughout the performance of the method and the change in the position of the shut-off element 3 is the only variable influencing the fluid flow which changes during the method. It is furthermore preferably also provided that the fluid is drawn by a pump 9 through the rate-of-flow control valve 10 and the chamber 2 and the throughflow opening 6 during the performance of the method, wherein it is preferably provided that the regulating valve 1 is arranged between the pump 9 and the chamber 2.

In the alternative embodiments explained above of the method according to the invention for determining the correction value K, the butterfly valve shown in FIGS. 2 and 3 has been used in each case as the regulating valve 1. The method according to the invention for determining the correction value K is, however, not restricted to this type of valve. Alternatives of regulating valves 1, chosen by way of example, which can be used in the methods according to the invention are shown in a highly schematic form and by way of example in FIGS. 16 to 21. A so-called pendulum valve is illustrated in a highly schematic form in FIGS. 16 to 18. The shut-off element 3 is a valve disk in this case too. In the case of a pendulum valve, it is pivoted by the actuator 5, not illustrated explicitly in FIGS. 16 to 18, about the pivot axis 13 running parallel to a perpendicular 14 to the valve disk. This pivot axis 13 runs as a rule at the edge or next to the valve disk. In addition, a limit stop 15 is also illustrated in FIGS. 16 to 18. Such pendulum valves are known per se such that they do not need to be explained further and also not illustrated in more detail. The different positions of the shut-off element 3 are also in this type of valve different angular positions which are then associated in each case with a corresponding encoder value E. FIG. 16 shows by way of example a position of the shut-off element 3 on a first side of the minimum throughflow position. FIG. 17 shows the minimum throughflow position and FIG. 18 a position on the other side of the minimum throughflow position. The method according to the invention for determining the correction value K can be performed with such regulating valves 1 in the same manner, as already described above, as in the case of a butterfly valve according to FIGS. 2 and 3. It is also provided here that the position of the shut-off element 3 at which the maximum Pmax of the pressure values P is measured is identified by the regulating device 4 as the minimum throughflow position of the shut-off element 3 and the encoder value at which the minimum throughflow position is identified is determined as the correction value K.

In the case of the regulating valve 1 which is illustrated schematically in FIGS. 19 to 21, the shut-off element 3 is again a valve disk. However, in this type of valve, the latter is not pivotable and instead is mounted so that it can be displaced by the actuator 5. In the exemplary embodiment shown here, the displacement of the shut-off element 3 is effected by the actuator 5, also not illustrated here, along the linear guide 18. Such regulating valves 1 of the sliding gate type are known per se and likewise do not need to be explained further. It is also possible for the method according to the invention for determining the correction value K to be performed with them, wherein the different positions of the shut-off element 3 are then not different angular positions and instead are positions arranged along a preferably linear axis. FIG. 19 shows by way of example again how, when performing the method according to the invention for determining the correction value K, the shut-off element 3 can initially be arranged to one side of the minimum throughflow position. The minimum throughflow position is again shown in FIG. 20. FIG. 21 shows the shut-off element 3 in a position in which it is already moved beyond the minimum throughflow position. Also in such variants of regulating valves 1, corresponding limit stops 15 can but do not have to be present. If these limit stops 15 are present, a method according to the invention for determining a correction value K can provide that the method begins with a starting position of the shut-off element 3 in which the shut-off element 3 is situated against the limit stop 15. However, as explained at the beginning, this does not have to be so. The limit stop 15 can also be omitted in all the exemplary embodiments. In the absence of a limit stop 15, all the possible positions of the shut-off element 3 can, for example, also be covered when the method according to the invention is performed. However, as a rule it is sufficient to cover a certain range of positions in which the user of the method according to the invention expects the minimum throughflow position.

Once the correction value K has been determined according to the invention in the manner outlined, it can then be used for the operation or normal operation of the regulating valve 1. It is here a method according to the invention for regulating the position of the shut-off element 3 of the regulating valve 1 by the regulating device 4, wherein the position to be activated in each case of the shut-off element 3 is determined by the regulating device 4, taking into account the correction value K determined according to the invention. Such a method is illustrated on the basis of the illustration in FIG. 22. The pressure value P measured by the pressure sensor 8 is here again illustrated plotted against the encoder value E. Also shown is the true angle which the shut-off element 3 assumes with respect to the minimum throughflow position in the first exemplary embodiment. In order to set the minimum throughflow position, in this method according to the invention the regulating device 4 does not activate the shut-off element 3 with the encoder value E equal to 0 and instead with the encoder value E equal to 4, wherein this encoder value E is determined just on the basis of the correction value K. In the example shown in FIG. 22, the correction value K is equal to 4. FIG. 23 shows the minimum throughflow position of the shut-off element 3 at the encoder value E equal to 4. FIG. 24 shows by way of example the position of the shut-off element 3 at the encoder value E equal to 14. In the case of normal operation, illustrated by way of example on the basis of FIG. 22, of the regulating valve 1, the shut-off element 3 is preferably exclusively moved into those positions in which the respective encoder value E is greater than or equal to the correction value K. Alternatively, it would also be conceivable that the respective encoder value E is smaller than or equal to the correction value K. Ultimately, this just means that only positions of the shut-off element 3 on one side of the minimum throughflow position are set and not, as when the method for determining the correction value is performed, that positions on both sides of the minimum passage position are covered.

KEY TO REFERENCE SYMBOLS

1 regulating valve
2 chamber
3 shut-off element
4 regulating device
5 actuator
6 throughflow opening
7 encoder
8 pressure sensor
9 pump
10 rate-of-flow control valve
11 first direction
12 second direction
13 pivot axis
14 perpendicular
15 limit stop
16 valve housing
17 fluid line
18 linear guide
E encoder value
P pressure value
Pmax maximum
K correction value
K1 first correction value
K2 second correction value
W angle

The invention claimed is:

1. A method for determining a correction value for a regulating device for a regulating valve, wherein the regulating valve regulates a fluid flow through a chamber, the method comprising:
   a) placing a shut-off element of the regulating valve in mutually different positions relative to a throughflow opening for a fluid by an actuator of the regulating valve using the regulating device;
   b) providing an encoder, wherein each position of the shut-off element corresponds to an encoder value of the encoder;
   c) measuring a pressure value with a pressure sensor in mutually different positions of the shut-off element;

d) identifying a position of the shut-off element at which a maximum of the pressure values is measured as a minimum throughflow position of the shut-off element; and e) determining the correction value from the encoder value at which the minimum throughflow position is identified;

wherein fluid is continuously flowing through the chamber throughout performance of the method such that the change in the position of the shut-off element is the only variable influencing the fluid flow which changes during the performance of the method.

2. The method as claimed in claim 1, wherein the pressure value is representative of the fluid in the chamber.

3. The method as claimed in claim 1, further comprising drawing the fluid by a pump through a rate-of-flow control valve, the chamber and the throughflow opening during the performance of the method.

4. The method as claimed in claim 3, further comprising arranging the regulating valve between the pump and the chamber.

5. The method as claimed in claim 1, wherein the shut-off element is a valve disk which is pivotable by the actuator about a pivot axis running along the valve disk, and the valve disk projects beyond the pivot axis on sides of the pivot axis which are situated opposite each other.

6. The method as claimed in claim 1, wherein the shut-off element is a valve disk which is pivotable by the actuator about a pivot axis running parallel to a perpendicular to the valve disk.

7. The method as claimed in claim 1, wherein the shut-off element is mounted for displacement by the actuator.

8. A method for regulating the position of a shut-off element of a regulating valve by a regulating device, the method comprising determining a position of the shut-off element which is to be activated in each case by the regulating device, taking into account the correction value determined with the method as claimed in claim 1.

9. A method for determining a correction value for a regulating device for a regulating valve, wherein the regulating valve regulates a fluid flow through a chamber, the method comprising:

a) placing a shut-off element of the regulating valve in mutually different positions relative to a throughflow opening for a fluid by an actuator of the regulating valve using the regulating device;

b) providing an encoder, wherein each position of the shut-off element corresponds to an encoder value of the encoder;

c) measuring a pressure value with a pressure sensor in mutually different positions of the shut-off element;

d) identifying a position of the shut-off element at which a maximum of the pressure values is measured as a minimum throughflow position of the shut-off element; and e) determining the correction value from the encoder value at which the minimum throughflow position is identified; and performing steps a)-d) a first time in which the fluid passes through the positions of the shut-off element in a first direction, and determining a first correction value at which the minimum throughflow position is identified for the first time, and performing steps a)-d) a second time in which the fluid passes through the positions of the shut-off element in a second direction, opposite to the first direction, and determining a second correction value at which the minimum throughflow position is identified for the second time, and step e) includes determining the correction value based on the first correction value and the second correction value.

10. The method as claimed in claim 9, wherein the pressure value is representative of the fluid in the chamber.

11. The method as claimed in claim 9, further comprising drawing the fluid by a pump through a rate-of-flow control valve, the chamber and the throughflow opening during the performance of the method.

12. The method as claimed in claim 11, further comprising arranging the regulating valve between the pump and the chamber.

13. The method as claimed in claim 9, wherein the shut-off element is a valve disk which is pivotable by the actuator about a pivot axis running along the valve disk, and the valve disk projects beyond the pivot axis on sides of the pivot axis which are situated opposite each other.

14. The method as claimed in claim 9, wherein the shut-off element is a valve disk which is pivotable by the actuator about a pivot axis running parallel to a perpendicular to the valve disk.

15. The method as claimed in claim 9, wherein the shut-off element is mounted for displacement by the actuator.

16. A method for regulating the position of a shut-off element of a regulating valve by a regulating device, the method comprising determining a position of the shut-off element which is to be activated in each case by the regulating device, taking into account the correction value determined with the method as claimed in claim 9.

17. A method for determining a correction value for a regulating device for a regulating valve, wherein the regulating valve regulates a fluid flow through a chamber, the method comprising:

a) placing a shut-off element of the regulating valve in mutually different positions relative to a throughflow opening for a fluid by an actuator of the regulating valve using the regulating device;

b) providing an encoder, wherein each position of the shut-off element corresponds to an encoder value of the encoder;

c) measuring a pressure value with a pressure sensor in mutually different positions of the shut-off element;

d) identifying a position of the shut-off element at which a maximum of the pressure values is measured as a minimum throughflow position of the shut-off element; and e) determining the correction value from the encoder value at which the minimum throughflow position is identified;

wherein the regulating valve has a starting position and the shut-off element is placed, starting from the starting position of the shut-off element, in mutually different positions relative to the throughflow opening for the fluid flow for performing the method, and the starting position is specified by a limit stop.

18. A method for regulating the position of a shut-off element of a regulating valve by a regulating device, the method comprising determining a position of the shut-off element which is to be activated in each case by the regulating device, taking into account the correction value determined with the method as claimed in claim 17.

* * * * *